United States Patent [19]

Pearsall et al.

[11] Patent Number: 4,775,919

[45] Date of Patent: Oct. 4, 1988

[54] LIGHTED WHEEL COVER WITH A SELF-CONTAINED INERTIA-OPERATED GENERATOR

[75] Inventors: Elmer G. Pearsall, Gadsden; Bruce W. Biggard, Arab; Gary E. Wisner, Boaz, all of Ala.

[73] Assignee: Syncro Corporation, Arab, Ala.

[21] Appl. No.: 12,397

[22] Filed: Feb. 9, 1987

[51] Int. Cl.⁴ .............................................. B60Q 1/26
[52] U.S. Cl. ..................................... 362/78; 310/67 A
[58] Field of Search ................... 362/72, 78, 234, 249, 362/252, 296, 806; 340/134; 310/67 A, 68 B

[56] References Cited

U.S. PATENT DOCUMENTS

| | | | |
|---|---|---|---|
| 2,931,012 | 3/1960 | Kosach | 362/78 X |
| 3,884,317 | 5/1975 | Kinzel | 310/67 A X |
| 4,229,728 | 10/1980 | Tremba | 310/68 B X |
| 4,381,537 | 4/1983 | Hinrichs | 362/78 |
| 4,539,496 | 9/1985 | Thomas et al. | 310/68 B |

FOREIGN PATENT DOCUMENTS

| | | | |
|---|---|---|---|
| 26950 | 4/1981 | European Pat. Off. | 362/72 |
| 978808 | 11/1950 | France | 362/72 |
| 1401442 | 4/1965 | France | 310/67 A |
| 57-71257 | 5/1982 | Japan | 310/67 A |

Primary Examiner—Tony M. Argenbright
Assistant Examiner—Eric R. Carlberg
Attorney, Agent, or Firm—Townsend and Townsend

[57] ABSTRACT

A signalling wheel cover, including inner and outer housings, is provided with lights around the circumference of the outer housing which sequentially illuminate as the two housings rotate with respect to one another. The outer housing is secured to a vehicle wheel. Coils, to which the lights are connected, are mounted to the outer housing. The inner housing, to which magnets are mounted, is rotatably secured relative to the outer housing to allow independent rotation of the two housings. As the wheel carrying the outer housing begins to rotate, the inner housing tends to resist the rotation due to its inertia. This resistance to rotation can be enhancedd by adding a counterweight to the inner housing so the inner housing is mounted pendulously. As the coils rotate through the magnetic fields of the magnets, current flow is induced in the coils which causes illumination of the lights in a sequential pattern.

12 Claims, 2 Drawing Sheets

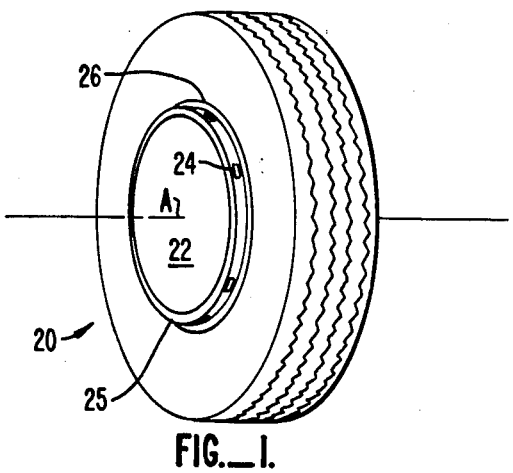
FIG._1.
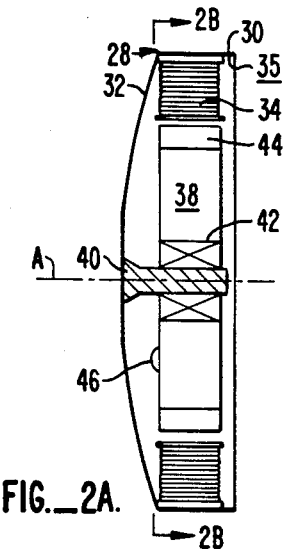
FIG._2A.
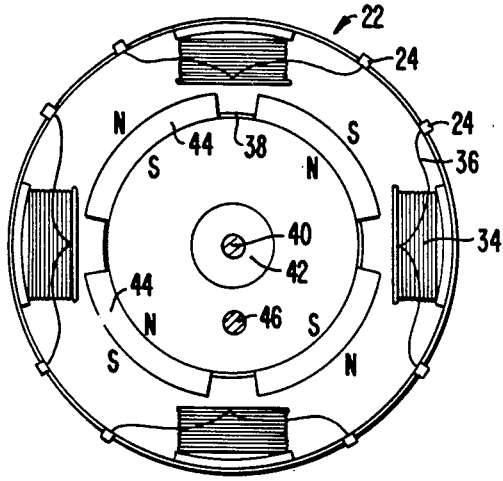
FIG._2B.
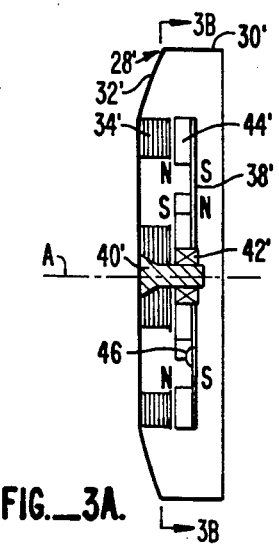
FIG._3A.
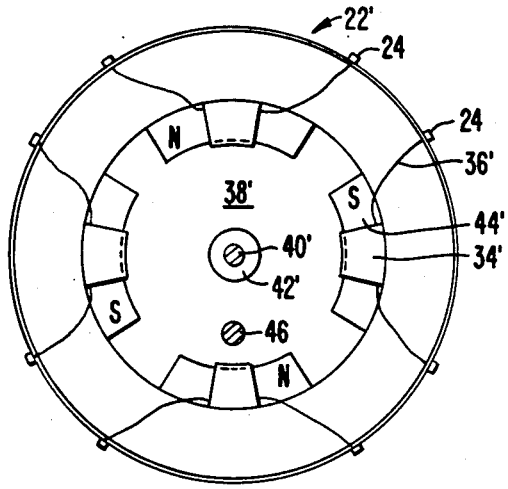
FIG._3B.

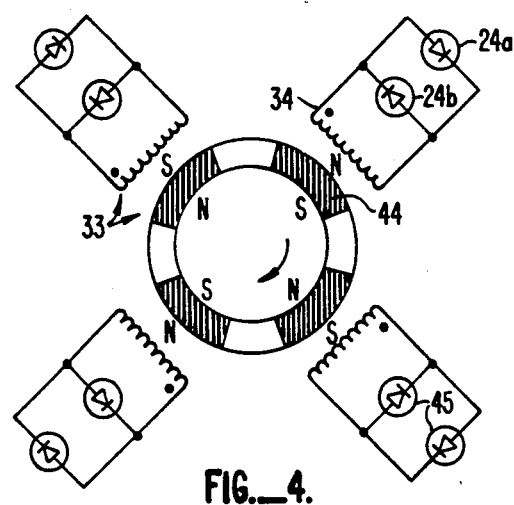
FIG._4.
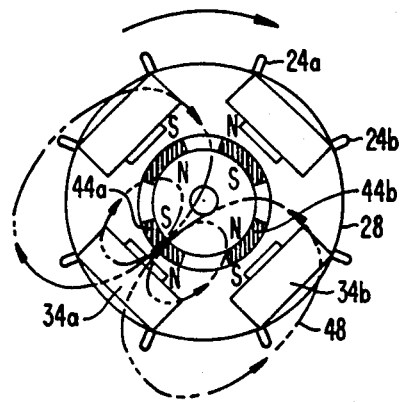
FIG._5.
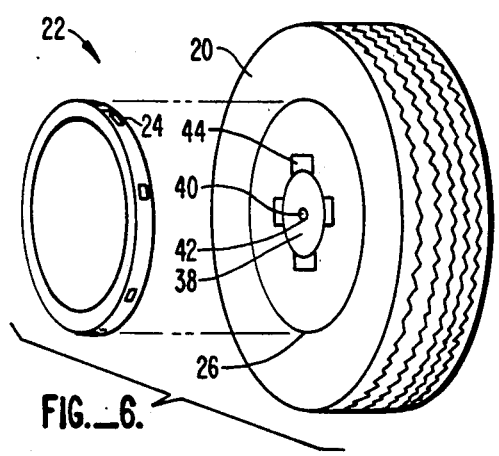
FIG._6.

LIGHTED WHEEL COVER WITH A SELF-CONTAINED INERTIA-OPERATED GENERATOR

BACKGROUND OF THE INVENTION

1. Field of the Invention

The present invention relates generally to an illuminating vehicle wheel cover, and more particularly to an inertia-operated generator fitted to a vehicle wheel cover such that rotation of the wheel cover generates current to illuminate lighting devices secured to the wheel cover.

2. Description of the Prior Art

Devices mounted in the interior region between the hub of a vehicle wheel and a wheel cover mounted to the hub have been utilized for some time. See, for example U.S. Pat. No. 4,539,496, issued Sept. 3, 1985 to Thomas, et al., and U.S. Pat. No. 4,229,728, issued Oct. 21, 1980, to Tremba.

The patent to Thomas et al, discloses an inertia-operated, hubcap-mounted generator for transforming rotational energy of a wheel into electrical energy. The Thomas et al. generator, mounted in pendulum fashion between the hubcap and wheel hub, may be used to power various devices.

The patent to Tremba discloses a tire pressure monitor installed in a vehicle wheel cover. The monitor includes an RF generator which transmits a signal indicating whether the air pressure within the tire is below a predetermined value.

SUMMARY OF THE INVENTION

The present invention provides an improved inertia-operated generator which is combined with, and especially configured for, the energization of lighting devices on the wheel cover of a vehicle wheel. These lighting devices are primarily decorative and enhance the appearance of the wheel and the vehicle generally, particularly when the vehicle is driven at night.

The present invention is characterized as having at least two magnets, and preferably four such magnets, which are arranged on a pendulously-suspended support member and which face an equal number of similarly arranged generating coils. Each generating coil is electrically connected to at least one lighting device, for example, a light emitting diode (LED), which is mounted to the wheel cover to emit light exteriorly of the wheel cover. The generating coils are secured to an outer housing of the wheel cover which is secured to, and rotates with, the wheel. The pendulously-suspended support member is rotatably secured to the outer housing so that the outer housing is free to independently rotate about the support member. The pendulously-suspended support member carrying the magnets remains stationary as the wheel cover rotates as a result of inertia. To increase the inertia of the pendulously-suspended support member, an auxiliary weight may be secured to the member.

In one embodiment of the present invention the coils and magnets are arranged radially with respect to one another. In a second embodiment the coils and magnets are arranged axially with respect to one another.

In operation, the coils rotate through the magnetic fields established by the magnets thereby inducing current flow in the coils. The coils, being connected to lighting devices, such as LEDs, are part of a complete circuit such that the induced current flow causes illumination of the lighting devices.

In each preferred embodiment, te same housing which supports the generating coils also supports the lighting devices proximate the generating coils to minimize the lead lengths between the lighting devices and the generating coils. The housing containing the generating coils and the lightng devices preferably constitutes the external or outer housing of the wheel cover.

In a preferred embodiment, two lighting devices are associated with each coil. Thus, when two magnets and two coils are used there is provided a total of four lighting devices; when four magnets and four coils are used, eight lighting devices are provided. Adjacent magnets preferably have alternate north-south pole orientation, thereby establishing magnetic fields with alternating directions of flux paths. The lighting devices are preferably attached to each coil for operation with the alternating directions of current flow. That is, a first lighting device is operative with a first direction of current flow while an adjacent lighting device is operative with the opposite direction of current flow.

The lighting devices are located on the outer housing in a circular fashion, evenly spaced apart around the outer housing, with the two lighting devices associated with each coil in succession so that every other lighting device lights simultaneously while intermediate lighting devices are off. At the point at which current in the system reverses direction the intermediate lighting devices illuminate and the first-mentioned lighting devices are off. This gives the impression of the propagation of light pulses around the circular array of lighting devices on the wheel cover.

High efficiency of the device is achieved by orienting two or more magnets to work in cooperation with two or more generating coils so that each flux path passes through at least one generating coil at all times. For example, in a two magnet and two coil configuration the north pole of a first magnet is aligned with a first coil, the south pole of the second magnet is aligned with the second coil. A return flux path connects both coils such that the magnetic flux passes from the north pole through the first coil, through the return path to the second coil, then through the second coil to the south pole of the second magnet. Additionally, the opposite pole of each of the magnets, positioned away from the generating coils, are oriented to complete the flux path. The arrangement of magnets and coils is analogous in the four magnet and four coil configuration.

Various light conducting or enhancing devices, such as edge-emitting plastics or transparent lenses, can be used with the lighting devices to enhance the decorative visual effect of the device.

These and other features of the present invention will become readily apparent from the following detailed description, taken with reference to the figures of the accompanying drawings.

BRIEF DESCRIPTION OF THE DRAWINGS

FIG. 1 is a perspective view of a vehicle wheel showing the lighted wheel cover of the present invention, as installed;

FIGS. 2A and 2B are side and front cut-away views of a lighted wheel cover of a first embodiment of the invention, respectively;

FIGS. 3A and 3B are side and front cut-away views of a lighted wheel cover of a second embodiment of the present invention, respectively;

FIG. 4 is a schematic illustration of a magnet, coil and lighting device arrangement of the current generator of FIGS. 2A and 2B wherein the lighting devices are light emitting diodes;

FIG. 5 is a simplified illustration of a magnet, coil and light arrangement according to the embodiment of FIGS. 2A and 2B showing a typical magnetic flux path of that embodiment; and FIG. 6 is an exploded perspective view of a further embodiment of the present invention as mounted to a wheel.

DETAILED DESCRIPTION OF THE PREFERRED EMBODIMENTS

Referring to FIG. 1, a vehicle wheel 20 is shown with a lighted wheel cover 22 having lights 24 arranged according to one embodiment of the present invention. Vehicle wheel 20 has an axis of rotation A. Lighted wheel cover 22 attaches to vehicle wheel 20 at a hub or rim 26 of the vehicle wheel.

Referring now to FIGS. 2A and 2B, lighted wheel cover 22 is shown to include an outer housing 28 having an integral circumferential region 30 and face plate 32. Face plate 32 represents the primary surface of the wheel cover presented to an observer. Outer housing 28 also represents the primary housing for the current generating system 33 (FIG. 4) comprising coils 34, mounted to the inside surface 35 of region 30, light leads 36, connecting coils 34 to lights 24, and magnets 44. The mounting of magnets 44 is discussed below. Face plate 32 is therefore designed with aesthetic considerations balanced by the dimensional constraints of containing the current generating system 33.

Coils 34 are of a type well-known in the art and comprise a single primary winding, having two leads 36, about a core of appropriate material. Coils 34 are arranged to have their windings disposed generally perpendicular to the radius of the wheel cover 22 for reasons discussed below. The lighting devices 24 are, in this embodiment, light emitting diodes (LEDs).

Wheel cover 22 is further provided with an inner housing 38 disposed entirely within circumferential region 30. Inner housing 38 is mounted concentrically to the outer housing 28 via a shaft 40 and bearings 42 so as to rotate independently of the outer housing 28. Secured to inner housing 38 are four equally spaced magnets 44. Preferably, the number of magnets 44 provided on the inner housing 38 equals the number of coils 34 provided on the outer housing 28, although such is not required.

Magnets 44 are arranged radially around the inner housing 38 in positions such that magnets 44 pass close to coils 34. Magnets 44 are arranged with their north-south pole axes oriented radially. This, coupled with orientation of the windings of coils 34 being generally perpendicular to the wheel cover radius, causes the magnetic fields generated by magnets 44 to pass through coils 34 to generate electromotive potentials in coils 34. Adjacent magnets 44 have their like poles facing in opposite directions as indicated in FIG. 2B. The result of this alternating pole orientation is that magnetic fields with flux paths of opposite orientation are generated. This causes the resulting currents generated to pass in opposite directions for each passing magnet 44 as discussed further below.

An alternate embodiment is shown in FIGS. 3A and 3B. Lighting wheel cover 22' is generally similar to wheel cover 22. The primary difference being that coils 34' are positioned on the face plate 32' of outer housing 28' so as to have their windings oriented circumferentially. Inner housing 38', mounted to outer housing 28' via shaft 40' and bearings 42', as above, is oriented to present a planar surface to coils 34' in the plane of the windings. Disposed between coils 34' and inner housing 38' are magnets 44'. Magnets 44' are disposed on the inner housing 38' to pass next to coils 34'. Magnets 44' are positioned to have their north-south pole axes oriented parallel to axis A. In this embodiment, adjacent magnets 44' also have their poles facing in opposite directions. The result is a similar alternating of directions of magnetic flux between adjacent magnetic fields as described above with reference to wheel cover 22.

Referring now to FIG. 4, a schematic illustration of the functioning of wheel cover 22 is shown. The arrangement of coils 34 and magnets 44 are substantially as described in the embodiment discussed above with regard to FIGS. 2A and 2B, although the following description is equally applicable to the embodiment detailed in FIGS. 3A and 3B. Each magnet 44 establishes a magnetic flux path from its north pole to its south pole. The coils are presented proximate the magnets 44 so as to be within the flux paths of magnets 44 as magnets 44 and coils 34 rotate relative to one another. Connected to each coil are two LEDs 24a and 24b connected in parallel to the coils. In lieu of LEDs 24a and 24b, other lighting devices such as incandescent bulbs, preferably with corresponding diodes could be used. LEDs 24a and 24b are oriented opposite one another so that current will flow through only one of the LEDs at a time according to the electromotive potential across coil 34.

Referring to FIG. 5 as a chosen coil 34a passes through a magnetic field of one magnet 44a, current is induce to flow through chosen coil 34a in a first direction to illuminate one of the LEDs 24a or 24b associated with chosen coil 34a. As chosen coil 34a leaves the flux path of one magnet and enters the flux path of a second magnet 44b, which has a flux path oriented opposite to the flux path of first magnet 44a, the induced electromotive force across chosen coil 34a reverses direction to cause current to flow through the chosen coil in the opposite direction. As this happens, the other LED, 24a or 24b, is thus illuminated. The alternating direction of magnetic flux paths causes an alternating direction of current flow in the coil, which in turn causes an alternating lighting of LEDs 24a and 24b. When LEDs 24a and 24b are arranged sequentially around the circumference of the wheel cover, as shown in FIG. 5, and coils 34 are oriented as shown, LEDs 24a and 24b create a visual effect of propagation of light around the circumference of the wheel cover.

Ideally, magnets 44 function in cooperation with one another, for example as shown in FIG. 5, so that each flux path passes through at least one generating coil 34 at all times. When the north pole of one magnet 44a is aligned opposite chosen coil 34a, the south pole of second magnet 44b adjacent first magnet 44a is aligned with a second coil 34b adjacent chosen coil 34a. A flux path 48 connects adjacent coils 34a and 34b such that the magnetic flux passes from the north pole of one magnet 44a, through chosen coil 34a, to second coil 34b, then through second coil 34b to the south pole of second magnet 44b. Additionally, the opposite pole of each adjacent magnet 44a and 44b, which are positioned away from the generating coil, are connected by a complete flux path 48.

In operation, lighted wheel cover 22 is secured at points along outer housing 28 to rim 26 of vehicle wheel 20. Outer housing 28 then rotates with vehicle wheel 20 while inner housing 38 is free to rotate independent of both vehicle wheel 20 and outer housing 28. The inertia of inner housing 38 acts to resist rotation as outer housing 28 rotates about it, In this way the outer housing 28 and inner housing 38 rotate with respect to one another when the vehicle (not shown) is operated, causing an induced current flow in coils 44, thus illuminating LEDs 24. An additional weight 46 (FIGS. 2B and 3B) is preferably provided on inner housing 38 to help prevent the inner housing from rotation with outer housing 28.

Inner housing 38 may be pivotally secured to the axle about which wheel 20 rotates, as shown in FIG. 6. Outer housing 28, attached to the rotating wheel 20, then rotates around inner housing 38 as discussed above. However, here inner and outer housings 38, 28 are not physically connected.

To those skilled in the art to which this invention relates, many changes in construction and widely differing embodiments and applications of the present invention will suggest themselves without departing from its spirit and scope. Thus, the disclosures and descriptions herein are purely illustrative and are not intended to be in any sense limiting.

What is claimed is:

1. A signalling vehicle wheel cover, for use with a wheel of a vehicle, comprising:
   a first housing mounted to the wheel for rotation therewith;
   a second housing disposed proximate said first housing;
   means for mounting said second housing to a chosen one of the wheel and the first housing for rotational motion relative to said first housing;
   generating means, carried by said first and second housings, for generating a current when the first and second housings rotate relative to one another;
   signal means, electrically coupled to the generating means and secured to a selected one of said first and second housings, for generating a signal in response to the current generated by said generating means; and
   means for simulating propogation of said signal around the selected one of said first and second housings.

2. The signalling wheel cover according to claim 1, further comprising a counterweight secured to said second housing to restrict rotation of said second housing as the wheel rotates.

3. The signalling wheel cover according to claim 1, wherein said mounting means mounts said second housing to said first housing.

4. The signalling wheel cover according to claim 1, wherein said first housing surrounds said second housing.

5. The signalling wheel cover according to claim 1, wherein said mounting means comprises a shaft, secured to said first housing, and bearing, engaging said second housing and said shaft which allows rotational motion of said second housing relative to said first housing.

6. The signalling wheel cover according to claim 1, wherein said generating means comprises magnets and coils.

7. The signalling wheel cover according to claim 6, wherein said magnets are disposed on said second housing.

8. The signally wheel cover according to claim 7, wherein said coils are disposed on said first housing.

9. The signally wheel cover according to claim 7, wherein said second housing includes a circumferential portion, and said magnets have poles oriented radially with said circumferential portion.

10. The signalling wheel cover according to claim 9, wherein said coils are disposed on said first housing radially outwardly of said magnets.

11. The signalling wheel cover according to claim 1, wherein said signal means comprises light emitting diodes.

12. The signalling wheel cover according to claim 1, wherein the signal means is secured to the first housing.

* * * * *

UNITED STATES PATENT AND TRADEMARK OFFICE
CERTIFICATE OF CORRECTION

PATENT NO. : 4,775,919

DATED : October 4, 1988

INVENTOR(S) : Elmer G. Pearsall, Bruce W. Biggard and Gary E. Wisner

It is certified that error appears in the above-identified patent and that said Letters Patent is hereby corrected as shown below:

Claim 8, line 1, delete "signally" and substitute --signalling--.

Claim 9, line 1, delete "signally" and substitute --signalling--.

Signed and Sealed this

First Day of August, 1989

Attest:

DONALD J. QUIGG

Attesting Officer

Commissioner of Patents and Trademarks